United States Patent [19]
Meek et al.

[11] Patent Number: 5,497,715
[45] Date of Patent: Mar. 12, 1996

[54] SEED METERING DRIVE MECHANISM FOR SEED PLANTERS AND THE LIKE

[75] Inventors: Roger L. Meek; J. Michael McClure, both of Salina, Kans.

[73] Assignee: Great Plains Manufacturing Incorporated, Assaria, Kans.

[21] Appl. No.: 276,945

[22] Filed: Jul. 19, 1994

[51] Int. Cl.$^6$ .............................. A01C 7/16; A01C 7/18; A01C 7/20
[52] U.S. Cl. .......................... 111/137; 111/134; 111/135; 172/395; 172/675
[58] Field of Search .................................... 111/137, 134, 111/135, 177; 172/675, 395, 424

[56] References Cited

U.S. PATENT DOCUMENTS

| | | | |
|---|---|---|---|
| 3,200,778 | 8/1965 | Whelchel | 111/134 X |
| 4,027,606 | 6/1977 | Knapp | 111/137 X |
| 4,374,500 | 2/1983 | Westerfield | 111/137 X |
| 4,398,478 | 8/1983 | Frase et al. | 111/137 X |
| 4,404,918 | 9/1983 | Whalen et al. | 111/137 X |
| 5,235,922 | 8/1993 | Deckler | 111/137 |

FOREIGN PATENT DOCUMENTS 1064881  1/1984  U.S.S.R. ................... 111/137

OTHER PUBLICATIONS

White Farm Equipment Company 5100 Seed Boss Brochure, Form No. DM80–8.
Kinze Manufacturing, Inc.—Operator & Parts Manual (Manual #M0147), Model 2100, 3 Point Mounted Planter; front and back coversheets, pp. 6–4, 9–1, P20–P21, and P32–33.

*Primary Examiner*—Randolph A. Reese
*Assistant Examiner*—Christopher J. Novosad
*Attorney, Agent, or Firm*—Hovey, Williams, Timmons & Collins

[57] ABSTRACT

A metering drive mechanism is provided for use with a seed depositing implement adapted for movement across the ground. The mechanism includes a gauge wheel, an arm assembly supporting the gauge wheel for rolling engagement with the ground, and a mounting bracket on which the arm assembly pivots. The mechanism restricts upward pivoting movement of the arm assembly beyond a predetermined position, thus establishing the height of the implement. However, downward movement of the arm assembly is allowed in order to permit the gauge wheel to remain in contact with the ground at all times during travel. A spring urges the wheel against the ground with a force that remains constant, even when the predetermined position of the arm assembly relative to the bracket is changed to vary the height of the implement. The mechanism also includes an overriding clutch having a sprocket, a hub received in an opening of the sprocket for rotation relative to the sprocket, and a key supported on the sprocket for pivotal movement between a locking position and an unlocking position. A cylindrical plug of resilient material is supported on the sprocket for biasing the key toward the locking position.

7 Claims, 4 Drawing Sheets

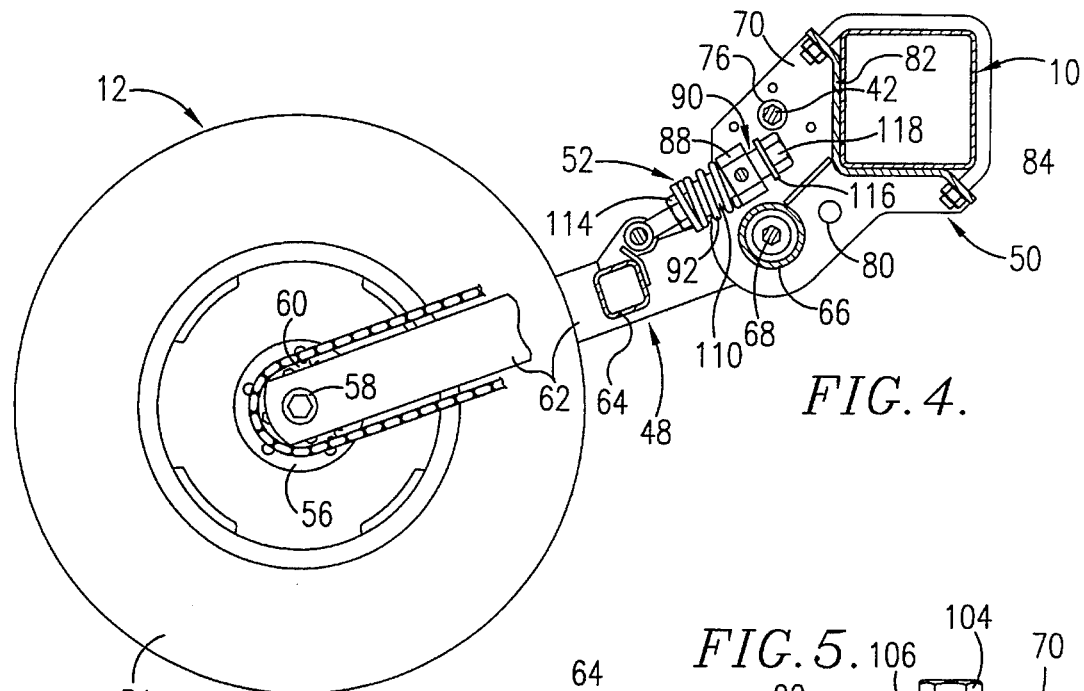
FIG. 4.
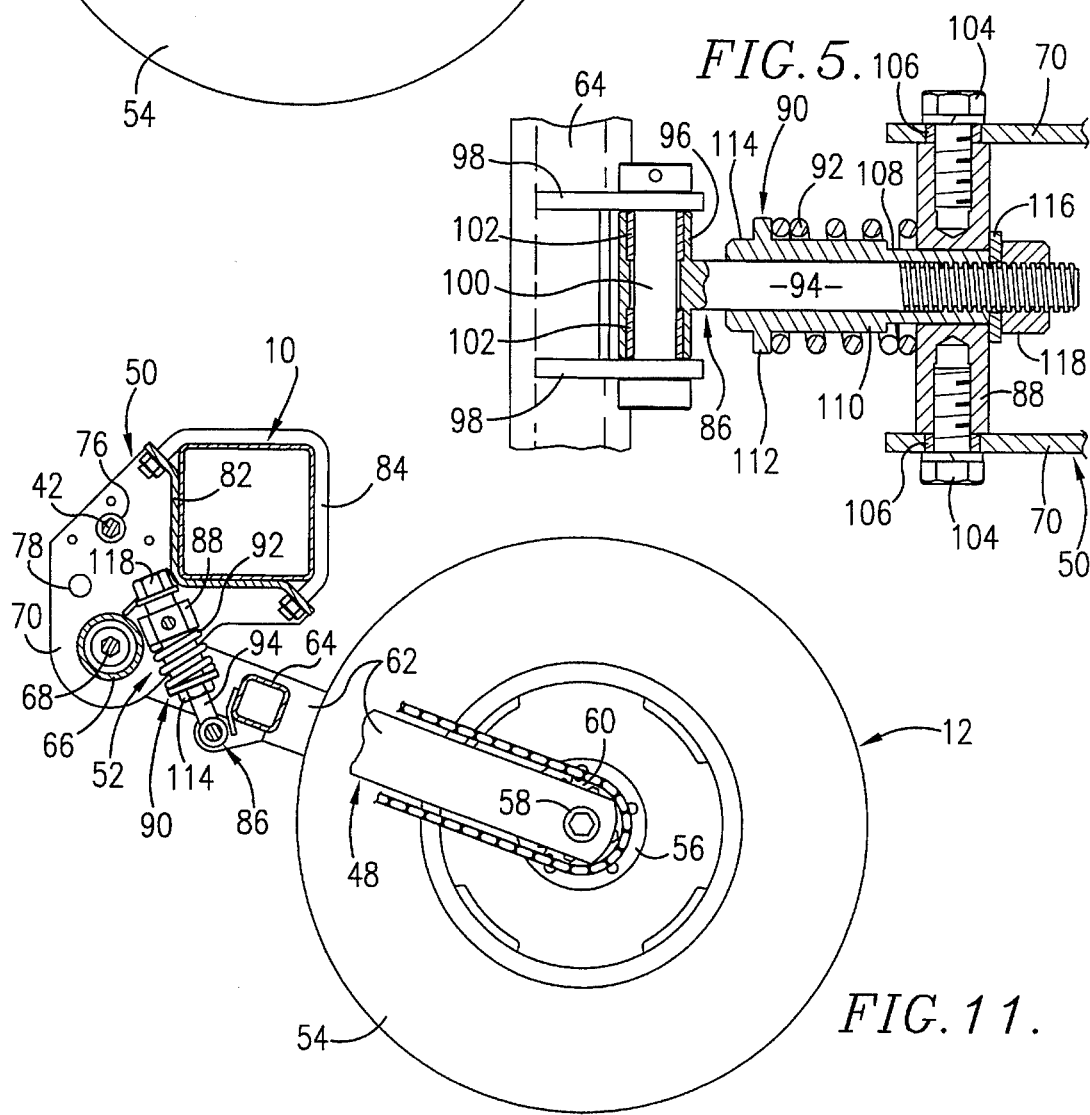
FIG. 5.
FIG. 11.

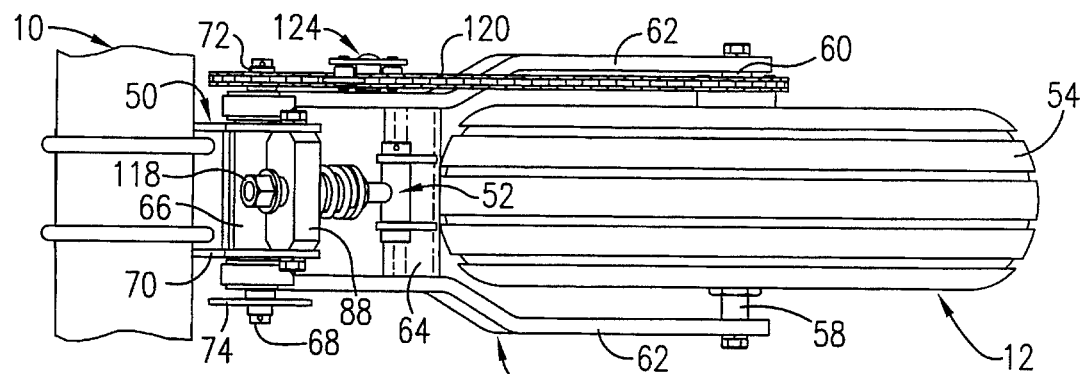
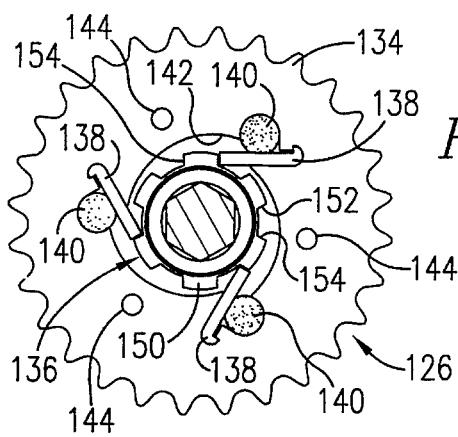
FIG. 7.
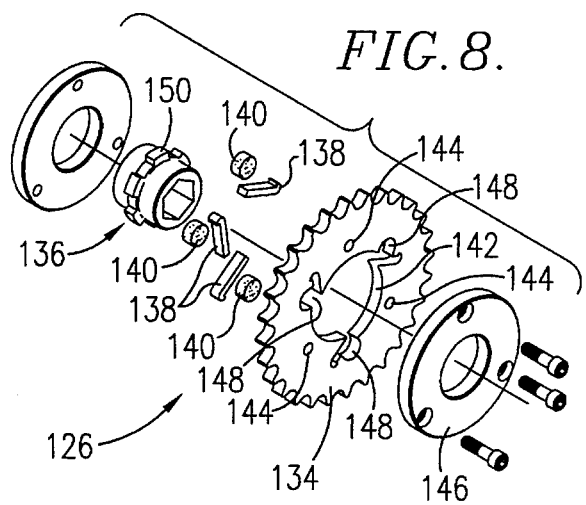
FIG. 9.
FIG. 8.
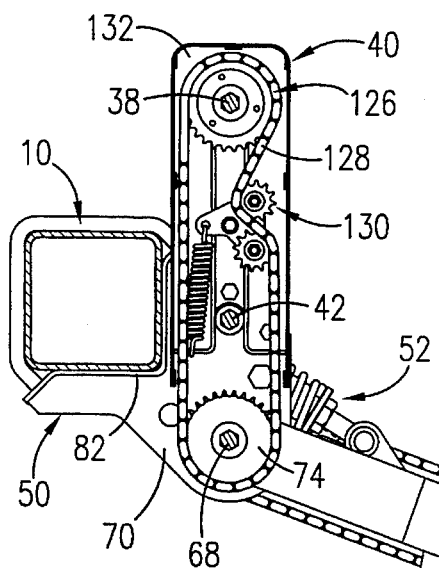
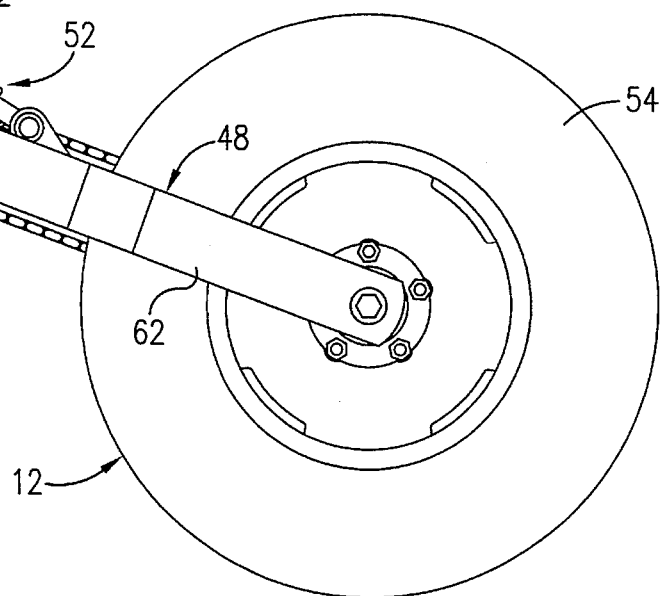
FIG. 6.

SEED METERING DRIVE MECHANISM FOR SEED PLANTERS AND THE LIKE

BACKGROUND OF THE INVENTION

1. Field of the Invention

The present invention relates generally to seed depositing implements, and more particularly to a seed metering drive mechanism having improved ground-driven gauge wheel and overriding clutch constructions.

2. Discussion of the Prior Art

In the use of conventional planters, it is known to provide a seed metering drive mechanism for measuring the speed of the implement, and controlling the rate at which seeds are deposited. A conventional construction includes a pair of laterally spaced gauge wheels adapted to roll across the ground, and a drive means for transmitting the rotational drive of the gauge wheels through a counter shaft and transmission to a metering drive shaft connected to each of the planter units on the implement. Thus, metering of the seeds is controlled by the drive mechanism.

The gauge wheels in a conventional construction support the implement above the ground, and may include structure for adjusting the height of the implement. In addition, a compression spring is provided in association with each gauge wheel for biasing the wheel toward the ground so that the wheels remain in contact with the ground as the planter travels over uneven ground. When the height of the implement is adjusted, the displacement of the spring is altered such that the biasing force exerted on the gauge wheel differs for differing implement heights. In order to remedy this shortcoming, conventional constructions provide structure for readjusting the spring displacement each time the height is changed.

There is a need with conventional metering drive mechanisms to permit the gauge wheels to be mounted either forward of or to the rear of the tool bar of the implement. By providing this adaptability, it is possible to accommodate different types of hitch and towing implements. In conventional constructions, it is sometimes possible to remove the gauge wheels completely from the tool bar, reverse their orientation, and reassemble them on the implement. However, this is difficult to carry out, and involves disassembly and reassembly of both wheel mounts.

During operation of a conventional planter, drive from both gauge wheels is transmitted to a single counter shaft, and it is necessary to employ an overriding clutch between the counter shaft and each gauge wheel so that the wheels are free to rotate relative to one another. By providing this construction, the implement is free to turn or to plant on a radius without creating torque problems in the counter shaft or slippage of the wheels.

On a conventional planter, the distance between the gauge wheels may range from 15–60 feet such that the difference in speed between the two wheels differs substantially as the planter travels along a radiused path. The provision of an overriding clutch between the counter shaft and each gauge wheel permits the counter shaft to be driven by the faster gauge wheel, while disengaging the shaft from the slower wheel.

A problem encountered with conventional drive mechanisms arises because of the size of available overriding clutches. For example, conventional clutches have a thickness greater than the thickness of other sprockets that are to be used in the transmission, and sometimes occupy 2.5 inches or more of space on the counter shaft. As a result, guarding shields designed to cover the overriding clutch and other transmission elements must be large enough to accommodate the clutch, and therefore use more material and space than is desirable.

OBJECTS AND SUMMARY OF THE INVENTION

It is an object of the present invention to provide a metering drive mechanism having a gauge wheel construction that maintains a constant selected down pressure on the wheel independent of variations in the adjusted height of the implement, thus eliminating the need for readjusting the biasing means each time the height of the implement is adjusted.

It is another object of the present invention to provide a metering drive mechanism including gauge wheels that are movable between positions forward of and to the rear of the tool bar of the implement, without requiring complete removal of the wheels from the implement.

Another object of the invention is to provide a metering drive mechanism having an overriding clutch construction of a size comparable to a conventional hub sprocket such that the clutch may be received within the same space as a sprocket, and does not require special guarding structure other than that required to cover other transmission components.

In accordance with these and other objects evident from the following description of a preferred embodiment of the invention, a metering drive mechanism is provided for use with a seed depositing implement. The mechanism includes a gauge wheel, an arm assembly supporting the gauge wheel for rotational movement along the ground, and a mounting bracket for securing the arm assembly to the implement so that the arm assembly can be pivoted about a generally horizontal axis.

The mechanism also includes a movement limiting means for restricting upward pivoting movement of the arm assembly beyond a predetermined position to establish the height of the implement, and for allowing downward movement of the arm assembly. A biasing means is provided for exerting a predetermined down pressure on the arm assembly to maintain the gauge wheel in contact with the ground during travel of the implement. The movement limiting means includes a height adjustment means for adjusting the predetermined position of the arm assembly relative to the bracket to vary the height of the implement, wherein operation of the height adjustment means does not alter the predetermined down pressure of the biasing means.

By providing a metering drive mechanism pursuant to this construction, numerous advantages are achieved. For example, by providing a movement limiting means which permits adjustment of the height of the implement without altering the predetermined down pressure of the biasing means, it is possible to eliminate the need for independent adjustment of the biasing means each time the height of the implement is changed. Thus, fewer steps are required to reposition the implement when the height is to be adjusted.

In accordance with another aspect of the present invention, a metering drive mechanism is provided with an improved overriding clutch apparatus. The apparatus includes a generally flat, circular sprocket having a central opening, a hub received in the opening for rotation relative to the sprocket, and presenting a generally radially extending locking surface, and a key supported on the sprocket for pivotal movement between a first position aligned radially with the locking surface and a second position radially outside of the locking surface. A cylindrical plug of resilient material is supported on the sprocket for biasing the key toward the first position so that as the hub rotates in a first direction relative to the sprocket, the locking surface and key engage one another to prevent further relative rotation of the hub in that direction. The hub includes a camming means for forcing the key radially outward toward the second position against the bias of the plug as the hub rotates in a second direction opposite the first direction so that the hub is free to rotate in the second direction relative to the sprocket.

By providing this construction, several advantageous results are obtained. For example, by employing a plug of resilient material between a sprocket and a key extending into the opening of the sprocket, it is possible to reduce the thickness of the apparatus relative to conventional constructions, and to accommodate the apparatus within about the same space as is normally required to accommodate a conventional hub sprocket.

BRIEF DESCRIPTION OF THE DRAWING FIGURES

The preferred embodiment of the present invention is described in detail below with reference to the attached drawing figures, wherein:

FIG. 4 is a fragmentary sectional view of a gauge wheel assembly forming a part of the drive mechanism;

FIG. 5 is a fragmentary sectional view of the gauge wheel assembly, illustrating height adjustment and biasing components of the assembly;

FIG. 6 is a fragmentary sectional view of the drive mechanism, illustrating an upper drive assembly;

FIG. 7 is a top plan view of the gauge wheel assembly;

FIG. 8 is an exploded view of an overriding clutch of the drive mechanism;

FIG. 9 is a side elevational view of the clutch;

FIG. 11 is a fragmentary sectional view of the gauge wheel assembly, illustrating the gauge wheel in an alternate position relative to the planter.

DETAILED DESCRIPTION OF THE PREFERRED EMBODIMENT

Figure 1:
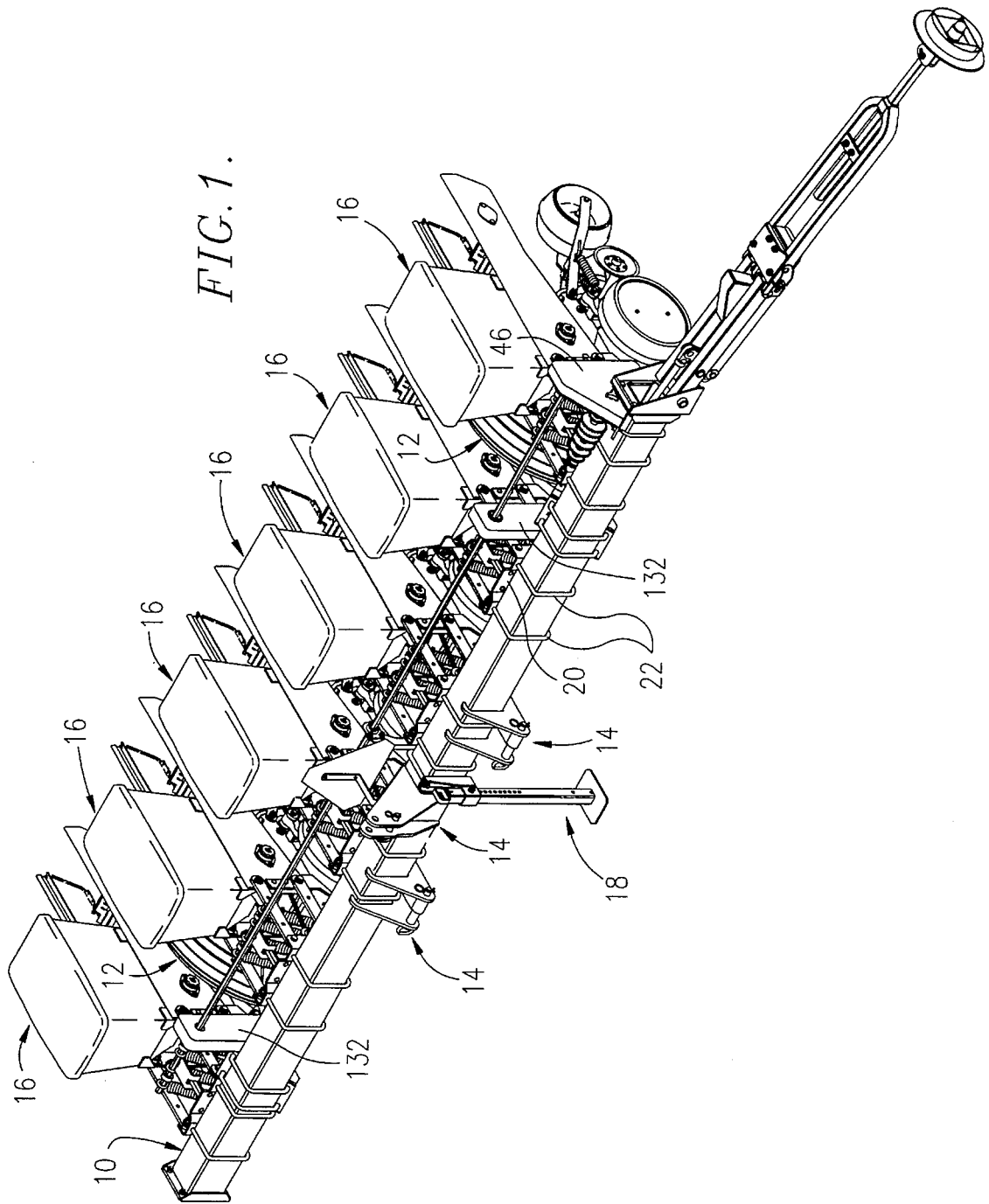
FIG. 1 is a perspective view of a seed planter incorporating a seed metering drive mechanism constructed in accordance with the preferred embodiment.

A seed planter constructed in accordance with the preferred embodiment is illustrated in FIG. 1, and broadly includes a frame 10, a pair of gauge wheels 12 supporting the implement above the ground, a plurality of hitch components 14 for connecting the planter to a towing implement, and several planter units 16 for depositing seeds into the ground as the planter traverses a field.

The frame 10 is referred to as a tool bar, and includes a hollow tube extending across the width of the planter and having a rectangular cross-sectional shape. The hitch components 14 are preferably welded or otherwise permanently affixed to the tool bar. A stand 18 may also be provided to support the planter when the planter is not connected to a towing implement.

Figure 2:
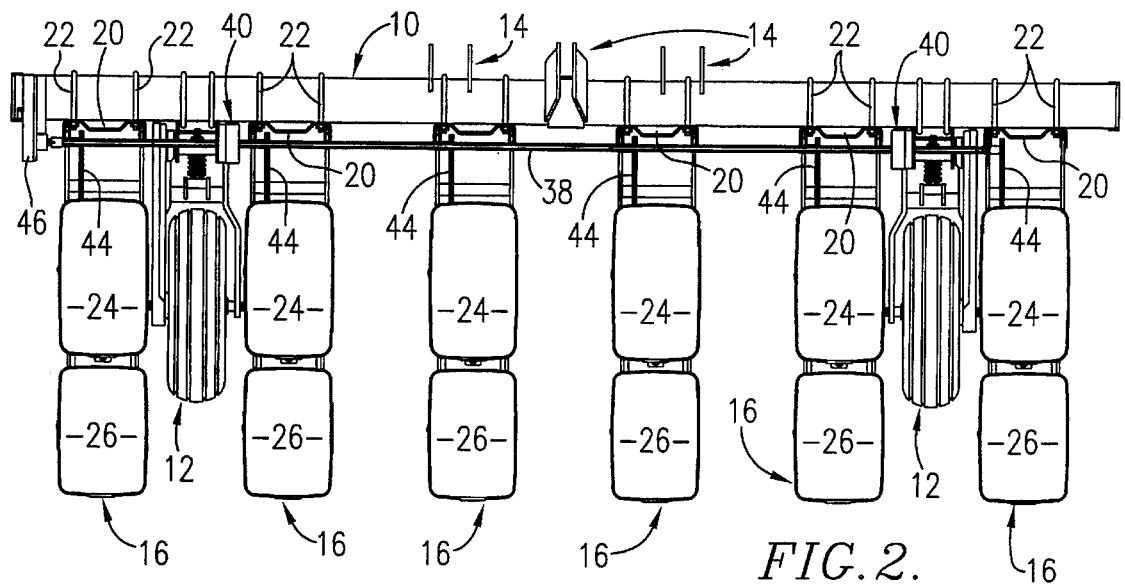
FIG. 2 is a top plan view of the planter.
Figure 10:
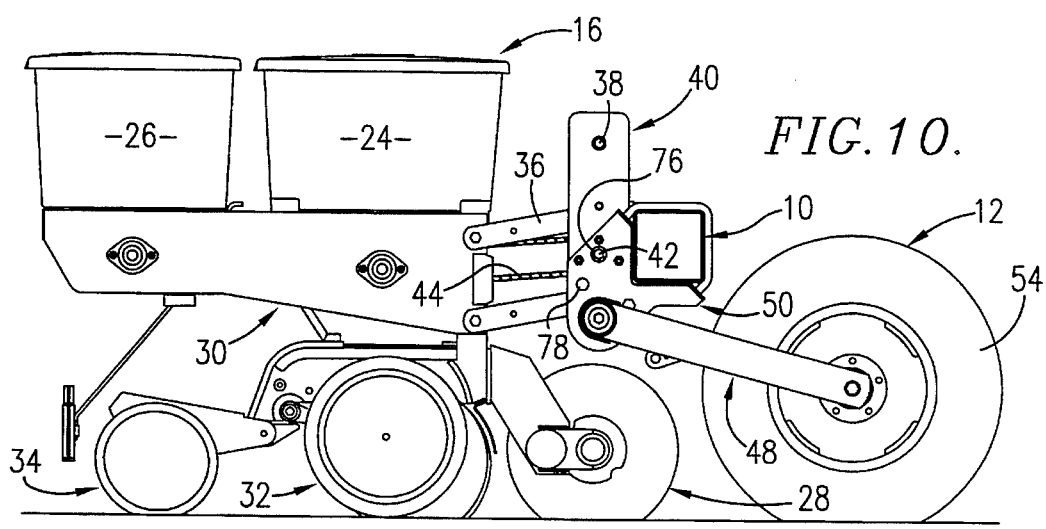
FIG. 10 is a side elevational view similar to FIG. 3, illustrating the gauge wheel in an alternate position relative to the planter.

As shown in FIG. 2, each planter unit 16 is supported on the tool bar by a bracket 20 and a pair of U-shaped bolts 22. Turning to FIG. 10, each planter unit includes seed and chemical hoppers 24, 26 supported above a disk assembly 28, a metering and dispensing assembly 30, a gauge wheel assembly 32 and a press wheel assembly 34. A parallel bar linkage 36 supports each planter unit on the associated bracket so that the unit can rise and fall with the ground independent of the other planter components.

A metering drive mechanism is provided on the planter for driving the metering and dispensing assemblies of the planter units, and includes the gauge wheels 12 and a transmission means for transmitting rotation of the wheels to each planter unit 16. As shown in FIG. 2, the transmission means preferably includes a counter shaft 38 extending between the two gauge wheels for picking up drive from the wheels. Each gauge wheel is connected to the counter shaft 38 by a chain and sprocket assembly 40 including an overriding clutch. As shown in FIG. 10, a meter drive shaft 42 extends along the tool bar and is connected with each planter unit via a chain 44. As shown in FIG. 2, the meter drive shaft picks up its drive from the counter shaft through a transmission assembly 46 located at one end of the tool bar. The transmission assembly includes a chain and sprockets, and permits the speed ratio between the counter shaft and meter drive shaft to be varied, as desired.

The two gauge wheels 12 are substantially identical to one another and are discussed with reference to only one of the gauge wheel assemblies. As shown in FIG. 4, the assembly includes the gauge wheel, an arm assembly 48 supporting the gauge wheel for rotational movement along the ground, a mounting bracket 50 for securing the arm assembly to the implement, and a height adjustment and biasing assembly 52.

The gauge wheel includes a tire 54 supported on a hub 56, and a spindle 58 on which the hub is supported for rotational movement. A sprocket 60 is connected to the hub and rotates with the wheel.

As shown in FIG. 7, the arm assembly 48 includes a pair of laterally spaced arms 62 that are connected together intermediate their ends by a cross bar 64. The spindle 58 of the gauge wheel extends between and is connected to the arms at one end of the arm assembly so that the tire 54 is supported between the arms. The opposite end of the arm assembly is supported on the bracket for pivotal movement about a generally horizontal axis.

Preferably, each arm 62 includes an opening collinear with the pivot axis, and a tube 66 extends between the arms and is received within these openings. The tube, in turn, is supported on a transfer shaft 68 by a pair of bearing assemblies which permit free relative rotation between the tube and shaft. Thus, the arm assembly may be pivoted about the axis of the transfer shaft, and the shaft is free to rotate relative to the arm assembly and bracket.

The mounting bracket 50 includes a pair of laterally spaced side plates 70, each provided with an opening within which the tube 66 is received. The plates 70 are spaced from one another by a distance less than the spacing between the arms 62 so that the arms are disposed outside of the plates when the arm assembly is supported on the tube. Sprockets 72, 74 are provided at the ends of the transfer shaft 68 outside of the arms 62. The side plates also include three additional sets of openings 76, 78, 80, as shown in FIGS. 4 and 11. The openings 76 are adapted to receive the meter drive shaft, and each of the other two sets of openings 78, 80 alternately receive the height adjustment and biasing assembly 52, as described below.

Turning to FIG. 4, a front plate 82 extends between and is connected to the side plates, and includes two pair of openings by which the bracket is secured to the tool bar. Preferably, a pair of modified U-shaped bolts 84 are used to connect the bracket to the tool bar.

The height adjustment and biasing assembly 52 is connected between the mounting bracket 50 and the arm assembly 48, and functions to restrict upward pivoting movement of the arm assembly beyond a predetermined position in order to establish the height of the implement, and for allowing limited downward movement of the arm assembly. The assembly 52 also functions to exert a predetermined down pressure on the arm assembly to maintain the gauge wheel in contact with the ground during travel of the implement.

As shown in FIG. 5, the assembly includes an elongated, threaded rod weldment 86 supported on the arm assembly, a trunnion 88 supported on the bracket, and a sleeve 90 received on the rod weldment and supported by the trunnion. In addition, a compression spring 92 is supported on the sleeve between the sleeve and the trunnion.

The rod weldment is T-shaped, and includes a threaded body 94, and a tubular cross piece 96 connected to the body and supported on the cross bar 64 of the arm assembly. Preferably, a pair of lugs 98 are welded to the cross bar and include aligned openings through which a pivot pin 100 extends. The rod weldment is supported by bushings 102 on the pin so that the weldment may pivot freely relative to the arm assembly.

The trunnion 88 is formed of an elongated piece of bar stock or the like, and includes openings in each axial end thereof through which the trunnion is connected to the side plates of the bracket by a pair of bolts 104. Bushings 106 are provided between the bolts and the side plates of the bracket for permitting the trunnion to rotate about the axes of the bolts. The trunnion also includes a transverse opening having a diameter larger than the diameter of the weldment, and adapted to receive the sleeve.

The sleeve 90 is generally tubular, and includes an inner circumferential surface that is threaded along a portion of the sleeve extending inward from one end thereof. The outer circumferential surface of the sleeve includes a small diameter portion 108, a large diameter portion 110, a radially protruding flange or seat 112, and a flat-sided head 114 adapted for engagement by a wrench or other gripping tool.

The small diameter portion 108 is formed of a diameter equal to or slightly less than the diameter of the transverse opening of the trunnion so that the sleeve may be translated axially relative to the trunnion within the opening. The large diameter portion 110 limits movement of the sleeve in one axial direction, and a washer 116 and lock nut 118 define a stop against which the trunnion abuts to limit movement of the sleeve in the opposite axial direction.

The compression spring 92 includes an inner diameter slightly greater than that of the large diameter portion of the sleeve, and is retained between the trunnion and the seat 112. Thus, when the sleeve is mounted on the trunnion, the spring exerts a predetermined down pressure on the arm assembly to maintain the gauge wheel in contact with the ground.

As shown in FIG. 7, drive from the wheel 12 is transmitted from the wheel sprocket 60 to one of the transfer shaft sprockets 72 by a chain 120, and as shown in FIG. 6, an upper transmission assembly 122 is connected to the other transfer shaft sprocket 74 for transmitting the drive to the counter shaft 38.

As shown in FIG. 7, a chain tensioning assembly 124 is supported on the arm assembly and maintains tension of the chain during operation. Preferably, the tensioning assembly includes a pair of small sprockets, each engaging the chain on an opposite side thereof, and a plate on which the sprockets are supported. The plate is supported on the arm assembly for pivotal movement about a horizontal axis and is biased toward a position in which the sprockets tension the chain. Preferably, a chain guard is also provided, and encloses the sprockets, chain and tensioning assembly.

The upper drive assembly is shown in FIG. 6, and includes the transfer shaft sprocket 74, an overriding clutch 126, and a chain 128 connected therebetween. In addition, a tensioning assembly 130 is provided for tensioning the chain, as is a chain guard 132, shown assembled in FIG. 1.

The overriding clutch 126 is shown in FIG. 9, and includes a sprocket 134, a hub 136, three keys 138, and three cylindrical plugs 140 formed of resilient material. The sprocket 134 is a generally flat, circular sprocket of the same thickness as the other sprockets used in the drive mechanism, and includes a central opening 142 adapted to receive the hub, keys, and plugs. Three additional openings 144 are provided for permitting a pair of side plates 146 to be connected to the sprocket to hold the components together in the assembled condition.

As shown in FIG. 8, the central opening 142 is generally circular, and includes three radial extensions 148 spaced equally around the opening. Each of these opening extensions is sized for receipt of one of the keys 138 and one of the plugs 140, with each plug positioned radially outside of the associated key so that the plugs bias the keys radially inward.

Each key 138 is formed of an elongated piece of heat treated, hardened steel or the like having a generally rectangular cross-sectional shape. The inner end of each key presents a flat end surface adapted to engage the hub, as described below. The outer end of each key presents a curved end surface and a laterally extending tang which retains the key within the opening extension of the sprocket. Preferably, the opening extension of the sprocket includes a surface which mates with the curved end surface of the key to permit the key to be pivoted within the extension.

The plugs 140 are formed of polyurethane or any other resilient compressible material capable of supplying the desired biasing force against the keys. Preferably, each plug is formed of a solid cylindrical piece of the resilient material, and is sized for receipt within the opening extension of the sprocket. By constructing both the keys and the plugs of a thickness equal to the thickness of the sprocket, the overall thickness of the clutch is reduced relative to conventional constructions.

The hub 136 is tubular, and includes a flat-sided inner circumferential surface adapted to engage the counter shaft, and a cylindrical outer surface. Several radially extending teeth 150 protrude from the hub and present locking surfaces 152 that are engaged by the keys when the sprocket rotates in the counterclockwise direction, viewed in FIG. 9. The teeth also present camming surfaces 154 which force the keys radially outward against the bias of the plugs as the sprocket rotates in the clockwise direction so that the sprocket is free to rotate in that direction without transmitting drive to the hub. Thus, drive is only transmitted from the sprocket through the hub when the sprocket rotates in the counterclockwise direction relative to the hub.

Figure 3:
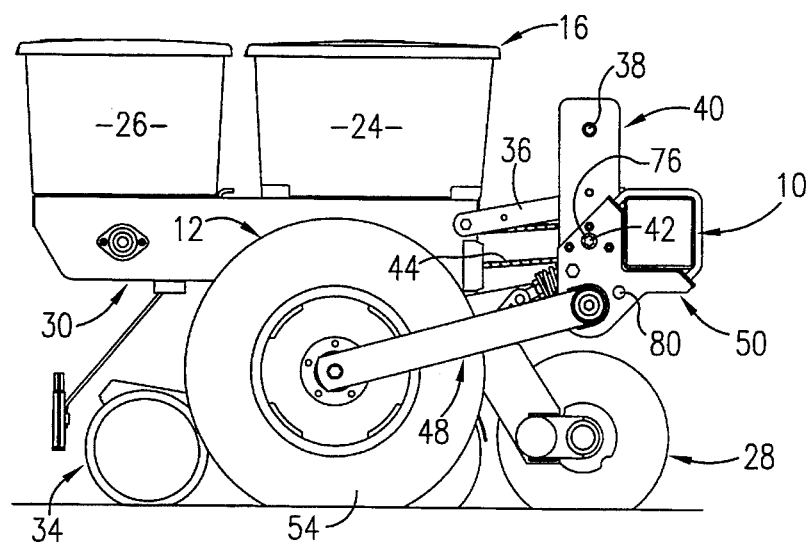
FIG. 3 is a side elevational view of the planter, with an end planter unit removed to illustrate the drive mechanism.

Turning to FIG. 3, as the implement is pulled along the ground in a direction to the right in the figure, the gauge wheels 12 support the implement and roll along the ground, providing drive to the meter drive shaft so that each planter unit meters seeds at a rate corresponding to the speed of the implement. During movement of the implement, as undulations and uneven ground are encountered, it is possible that a first of the gauge wheels will ride over high ground while the second wheel is crossing over a low spot. When this occurs, the spring of the height adjustment and biasing assembly on the second wheel biases the arm assembly downward to maintain contact between the wheel and the ground.

As shown in FIG. 4, pivoting movement of the arm assembly occurs around the axis of the transfer shaft 68, and is guided by axial movement of the sleeve 90 relative to the trunnion 88. The extent of downward movement of the arm is limited by the washer 116 connected to the end of the sleeve, and the stop defined by the large diameter portion 110 of the sleeve establishes the height of the implement by restricting upward pivoting movement of the arm assembly beyond a predetermined position.

With reference to FIG. 5, in order to adjust the height of the implement, the lock nut 118 on the weldment 86 is loosened, and the sleeve is turned on the weldment to adjust the axial position of the sleeve along the body of the weldment. For example, in order to increase the height of the implement, the sleeve 90 is moved away from the cross piece 96 of the weldment toward the trunnion 88. Once this adjustment is made, the locking nut 118 is again tightened against the sleeve, and prevents the sleeve and weldment from rotating further relative to one another.

Because the range of movement of the arm assembly and the displacement of the spring is defined solely by the length of the small diameter portion of the sleeve, and this relationship is not altered during adjustment of the rod within the sleeve, the biasing force exerted by the spring remains unchanged, even after changes are made in the height of the implement. Thus, it is not necessary to readjust the biasing force each time the height of the implement is changed.

When the planter is to be used with a one-point, pull-type towing implement, it is desirable to position the gauge wheels 12 forward of the tool bar so that they will be aligned with the support wheels of the towing implement. The present invention permits the mounting arm and gauge wheel assemblies to be pivoted from the rearward position illustrated in FIG. 3, to such a forward position, as shown in FIG. 10. Turning to FIG. 11, this operation requires only that the trunnion be removed from the openings 78 in the mounting bracket 50, and reattached to the bracket between the openings 80. When the trunnion is connected between the openings and the mounting arm is pivoted beneath the tool bar to the forward position, the height adjustment and biasing assembly 52 may be reconnected between the cross bar 64 of the arm assembly and the mounting bracket 50. This orientation of the assembly 52 continues to provide the same function as described above, wherein upward movement of the gauge wheel is restricted, and the wheel is biased downward to remain in contact with the ground during travel of the implement over undulations and the like.

Although the present invention has been described with reference to the preferred embodiment illustrated in the attached drawing figures, it is noted that substitutions may be made and equivalents employed herein without departing from the scope of the invention as recited in the claims.

What is claimed is:

1. A metering drive mechanism for use with a seed depositing implement adapted for movement across the ground, the mechanism comprising:

a gauge wheel adapted to provide driving input to a shaft of the mechanism;

an arm assembly supporting the gauge wheel for rotational movement along the ground;

a mounting bracket for securing the arm assembly to the implement, the arm assembly being mounted on the bracket for relative pivotal movement about a generally horizontal axis;

a movement limiting means for restricting upward pivoting movement of the arm assembly beyond a predetermined position to establish the height of the implement, and for allowing downward movement of the arm assembly; and a biasing means for exerting a predetermined down pressure on the arm assembly to maintain the gauge wheel in contact with the ground during travel of the implement, the movement limiting means including a height adjustment means for adjusting the predetermined position of the arm assembly relative to the bracket to vary the height of the implement, wherein operation of the height adjustment means does not alter the predetermined down pressure of the biasing means.

2. A metering drive mechanism as recited in claim 1, wherein the movement limiting means includes an elongated, threaded rod supported on the arm assembly for pivotal movement about a generally horizontal pivot axis, a trunnion supported on the mounting bracket for rotation about a generally horizontal pivot axis extending in a direction parallel to the pivot axis of the rod, and a sleeve received on the rod and supported by the trunnion for relative movement within a limited range in a direction transverse to the pivot axis of the trunnion, the biasing means being retained between the sleeve and the trunnion.

3. A metering drive mechanism as recited in claim 2, wherein the position of the sleeve on the rod is established by a threaded connection between the sleeve and rod, and is adjustable to change the predetermined position of the arm assembly relative to the implement.

4. A metering drive mechanism as recited in claim 2, wherein the trunnion includes a transverse opening, and the sleeve includes a reduced-diameter section sized for receipt in the transverse opening.

5. A metering drive mechanism as recited in claim 4, wherein the sleeve includes a seat, and the biasing means is retained between the seat and the trunnion to bias the sleeve away from the trunnion.

6. A metering drive mechanism as recited in claim 2, wherein the mounting bracket includes a means for mounting the trunnion in either of at least two different positions so that the orientation of the gauge wheel relative to the mounting bracket may be reversed.

7. A metering drive mechanism for use with a seed depositing implement adapted for movement across the ground, the mechanism comprising:

a gauge wheel adapted to provide driving input to the mechanism;

an arm assembly supporting the gauge wheel for rotational movement along the ground;

a mounting bracket for securing the arm assembly to the implement, the arm assembly being mounted on the bracket for relative pivotal movement about a generally horizontal pivot axis;

a movement limiting means for restricting upward pivoting movement of the arm assembly beyond a predetermined position to establish the height of the implement, and for allowing downward movement of the arm assembly so that the wheel is able to drop relative to the implement; and a biasing means for exerting a predetermined down pressure on the arm assembly to maintain the gauge wheel in contact with the ground during travel of the implement, the movement limiting means including an elongated, threaded rod supported on the arm assembly for pivotal movement about a generally horizontal pivot axis, a trunnion supported on the mounting bracket for rotation about a generally horizontal pivot axis extending in a direction parallel to the pivot axis of the rod, and a sleeve received on the rod and supported by the trunnion for relative movement within a limited range in a direction transverse to the pivot axis of the trunnion, the biasing means being retained between the sleeve and the trunnion.

* * * * *